United States Patent [19]
Ruth

[11] Patent Number: 5,833,097
[45] Date of Patent: Nov. 10, 1998

[54] NO-MESS BULK DISPENSER/MEASURER

[76] Inventor: Cathleen M. Ruth, 640 Primrose St., Haverhill, Mass. 01830

[21] Appl. No.: 841,805

[22] Filed: May 5, 1997

[51] Int. Cl.⁶ .................................................. G01F 11/10
[52] U.S. Cl. .......................... 222/368; 222/108; 141/280; 141/358
[58] Field of Search ................................ 222/108, 181.5, 222/367, 368; 141/358, 280, 313

[56] References Cited

U.S. PATENT DOCUMENTS

| | | |
|---|---|---|
| 628,622 | 7/1899 | Fulton . |
| 629,720 | 7/1899 | Holmes ................................ 222/368 X |
| 2,575,967 | 11/1951 | May ..................................... 222/368 X |
| 2,690,080 | 8/1954 | Rich . |
| 2,920,796 | 1/1960 | Field ................................... 222/368 X |
| 3,134,264 | 5/1964 | Miller . |
| 3,169,675 | 2/1965 | Gutzmann et al. ................. 222/368 X |
| 3,261,503 | 7/1966 | Cassidy .............................. 222/368 X |
| 3,735,899 | 5/1973 | Rollinson ............................. 222/368 X |
| 4,079,867 | 3/1978 | Tannehill ................................. 222/368 |
| 4,149,660 | 4/1979 | Kraus ..................................... 222/368 |
| 4,166,487 | 9/1979 | Spies ..................................... 222/306 |
| 4,266,695 | 5/1981 | Ruperez ................................. 222/363 |
| 4,448,331 | 5/1984 | Millette et al. ........................ 222/363 |
| 4,511,067 | 4/1985 | Martin et al. ....................... 222/368 X |
| 4,674,660 | 6/1987 | Botto .................................... 222/181.2 |
| 4,708,265 | 11/1987 | Bopst . |
| 4,867,350 | 9/1989 | Zelickson . |
| 4,892,233 | 1/1990 | Zelickson . |
| 4,957,219 | 9/1990 | Robbins et al. .................... 222/368 X |
| 4,964,535 | 10/1990 | Curwen ................................. 222/368 |
| 5,375,744 | 12/1994 | Henderson ............................ 222/306 |
| 5,445,053 | 8/1995 | Reed . |
| 5,499,749 | 3/1996 | Conant ................................. 222/368 |

FOREIGN PATENT DOCUMENTS 0 299 732   1/1989   European Pat. Off. .............. 222/368

*Primary Examiner*—Kenneth Bomberg
*Attorney, Agent, or Firm*—Baker & Botts, LLP

[57] ABSTRACT

A no-mess dispensing/measuring system is disclosed. The system includes a canister equipped with a rotor unit in its lower portion. The rotor unit includes paddles which may be rotated through the canister to propel bulk dry products stored in the canister out of an outlet and into a variable volume measuring receptacle.

14 Claims, 10 Drawing Sheets

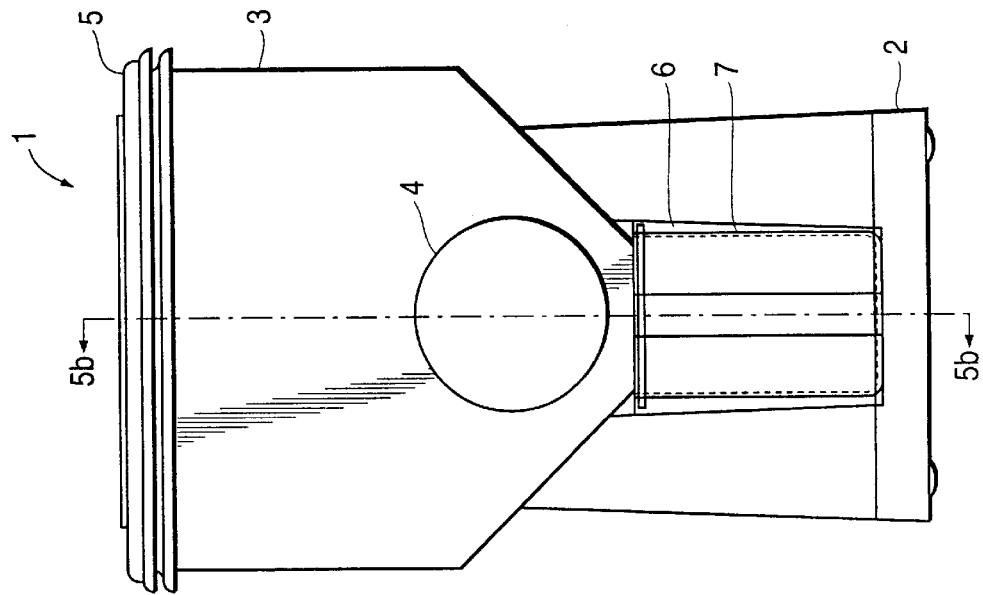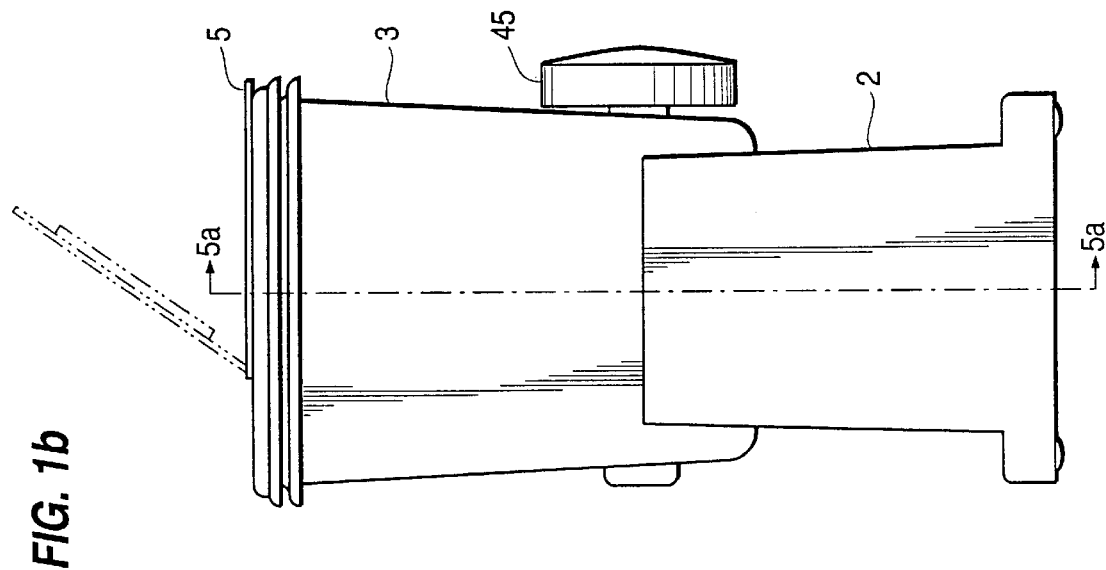

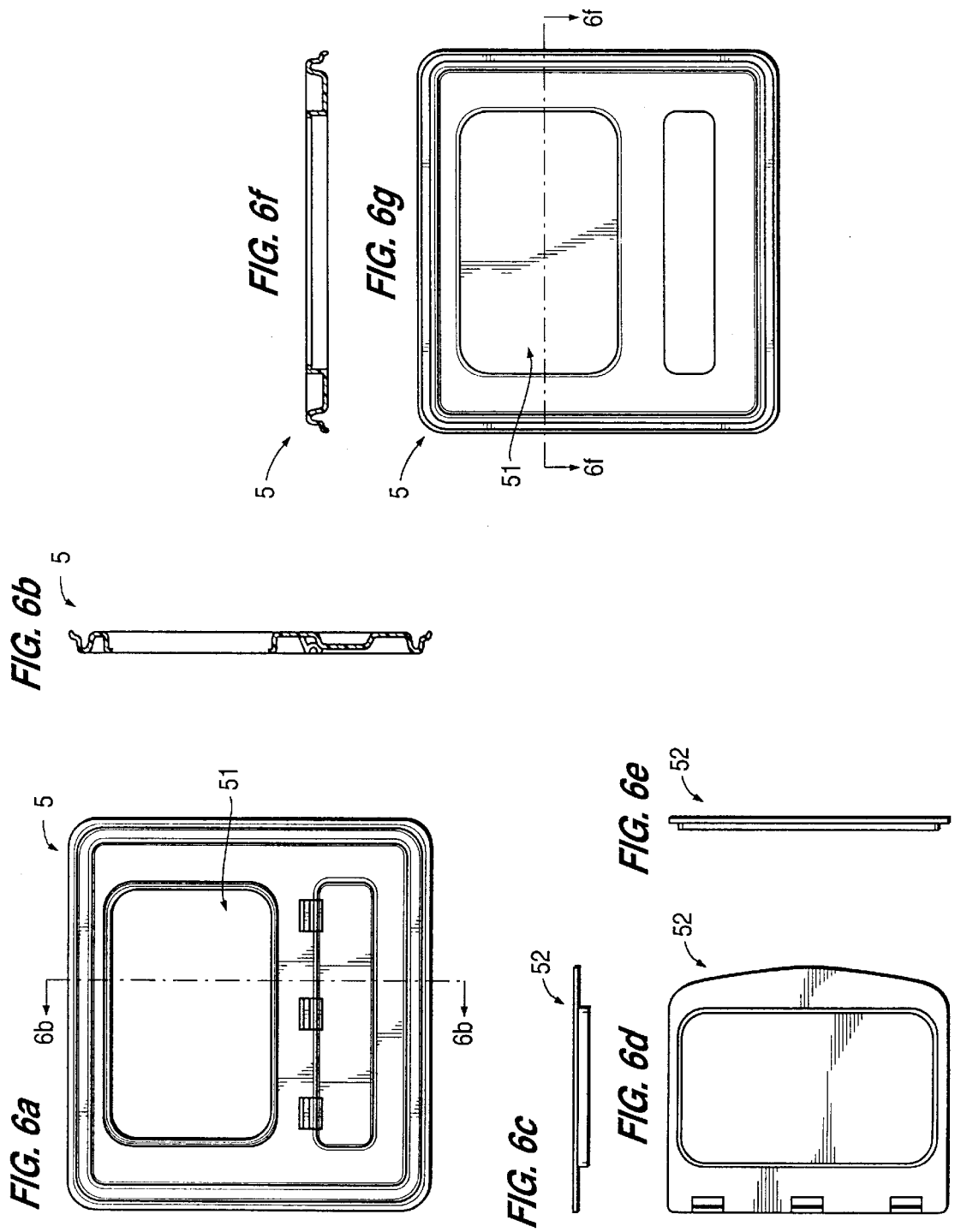

NO-MESS BULK DISPENSER/MEASURER

FIELD OF THE INVENTION

This invention is directed to a container system for storing, dispensing, and measuring powders and granulates.

REVIEW OF RELATED ART

A variety of devices have been developed for dispensing powders and/or granulated material such as, flour, sugar, coffee, bulk rices and cereals. In particular, an apparatus consisting of a hopper with a valve at the bottom, the valve containing inside it a fixed volume receiving chamber has been proposed in many variations. In general, the valve is designed to open toward the hopper allowing material to fall into the receiving chamber under the force of gravity. Once the receiving chamber is full, a metered volume of material is dispensed by emptying the receiving chamber. Variations on this common theme have been proposed in U.S. Pat. No. 5,375,744 which provides a valve having an elaborate mechanism to produce an adjustable size chamber within the valve body. This variation provides flexibility in the measurement function at the sacrifice of reliability. In U.S. Pat. No. 4,511,067, another variation provides a valve made up primarily of a rotor having a plurality of fixed size chambers. This permits variation in the amount of material dispensed by varying the number of chambers emptied into a waiting receptacle.

While these devices are generally suitable for large particulates, they do not reproducibly dispense the desired volume for powders or fine granulates. These devices all rely on passive loading of a fixed volume chamber with the material to be dispensed under the impetus of gravity. While this is sufficient for most particulate material, flow of powders and fine granulates is uneven and leads to inaccurate measures. Further, none of these devices is able to dispense and measure these dry products efficiently without creating a mess. Therefore, there remains a need for an improved device to store and dispense measured volumes of powders and granulates.

SUMMARY OF THE INVENTION

It is an object of this invention to provide a simple apparatus for storing and dispensing measured volumes of powders and granulates.

Faced with the mess created by measuring flour in a domestic situation, the inventor developed a dispensing and measuring system that solved the design problems of dispensing and measuring in a no-mess manner.

In one embodiment, the invention comprises a system for storing and dispensing a bulk dry product. The system includes a body portion having a base, at least one support member attached to the body portion, a canister for storing bulk dry product, and an outlet positioned in the bottom portion of the canister. The canister includes a bottom portion, a top portion and sidewalls connecting the top and bottom portions. The canister is integral with and positioned above the base, while the base and the at least one support member define a dry product receiving area beneath the canister. The top portion of the canister defines an opening through which the canister can be filled with dry products. The outlet enables communication between the dry product receiving area and the canister such that dry product may exit the canister through said outlet into the dry product receiving area.

The system also includes a rotor unit positioned in the bottom portion of the canister for dispensing dry product through said outlet into said dry product receiving area. The rotor unit includes a shaft rotatably mounted in the bottom portion of the canister above the outlet and, a plurality of paddles extending radially from the shaft. Each paddle is angularly separated from an adjacent paddle. Further, two of the paddles are connected by a sealing section at a point distal from the shaft. The sealing section seals the outlet. At least one of the paddles is sized to extend into the dry product receiving area and into the canister above the outlet. The system is operated through an operational control mounted to one end of the shaft on the exterior of the canister. The operational control is used to rotate the shaft.

The system finally includes at least one measuring receptacle sized to fit within the dry product receiving area. The measuring receptacle contains a definite volume of dry product, and has an opening sized larger than the outlet. In operation, the measuring receptacle is placed within the dry product receiving area to receive dry product propelled out of the canister by rotation of the shaft. Further, at least one of the paddles operates to level the dry product in the measuring receptacle.

The present invention relies on separation of the dispensing and measuring steps to simplify the mechanical aspect of the system while improving reliability. As a result the dispensing portion of the apparatus can focus on efficient transfer of powdered material from the canister, leaving measurement to the associated receptacle, and insuring that dispensing is accurate and reproducible for powders as well as particulates.

BRIEF DESCRIPTION OF THE DRAWINGS

FIGS. 1a and 1b depict front and side views of a no-mess bulk dispenser and measuring system according to one embodiment of the present invention.

FIGS. 6a to 6g depict a canister lid of a no-mess bulk dispenser and measuring system according to one embodiment of the present invention.

DETAILED DESCRIPTION OF THE EMBODIMENTS

Figure 2C:
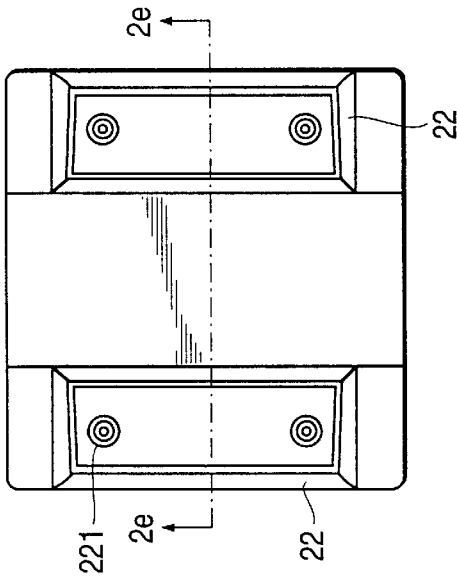
FIGS. 2a to 2f depict a base unit of a no-mess bulk dispenser and measuring system according to one embodiment of the present invention.
Figure 2E:
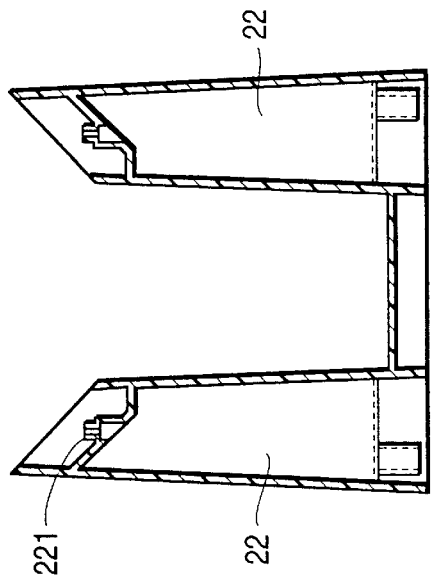
Figure 2B:
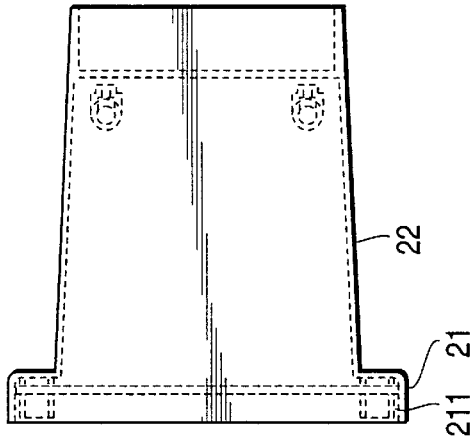
Figure 2D:
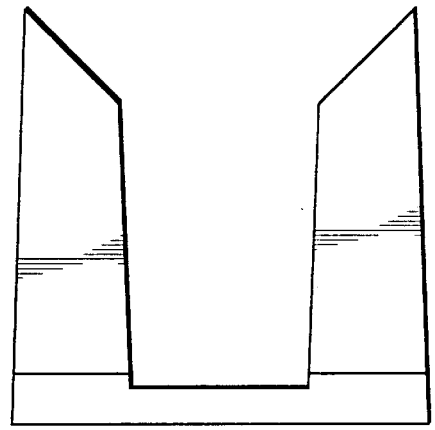
Figure 2A:
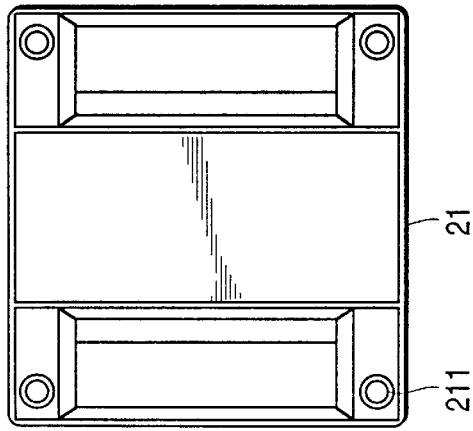
Figure 2F:
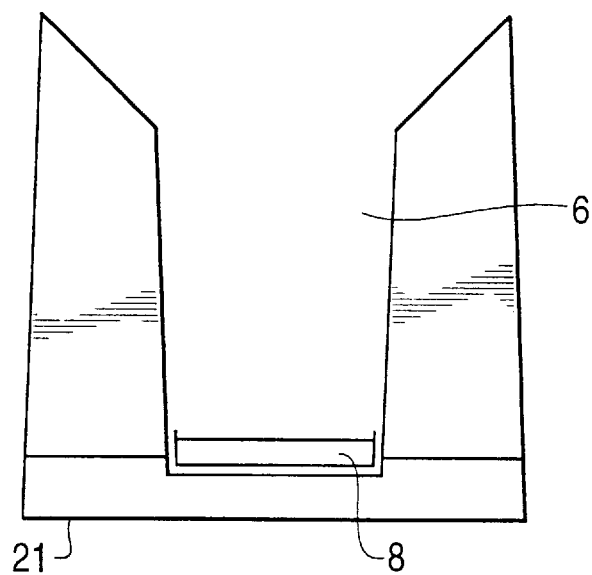

The present invention provides a unique canister/dispenser for dry products such as flour, sugar (granulated and powdered), coffee, cereals, bulk grains/rices, corn meal, pancake mix, etc, and is particularly useful for dispensing dry powders. The system dispenses a controlled amount of the bulk dry product into a specially designed adjustable capacity measuring receptacle quickly and without spillage. The dry product is stored in a canister and is dispensed by a rotor unit located within the canister. The rotor unit, controlled through a knob on the outside of the canister, forces the dry product out into a measuring receptacle and levels the dry product in the receptacle. The system contains an interlock so that the dry product either remains inside the canister or is dispensed into the measuring receptacle. If excess dry product falls outside of the measuring receptacle, the system includes a tray within the apparatus frame to catch the excess which can then be wiped away. Optionally, the tray is removable for easy cleaning. The system is preferably sized according to its intended use. For example, it could be sized for counter top, under-the-cabinet or industrial use. The system could also be mounted on a wall for convenience and space conservation. Alternatively, the system may be portable and sized for storage within a cabinet until needed.

A no-mess bulk dispensing and measuring system 1 according to one embodiment of the present invention will now be explained in conjunction with FIGS. 1–6. Front and side views of system 1 are shown in FIGS. 1*a* and 1*b* respectively. System 1 includes base unit 2, canister 3, rotor knob 45 connected to rotor unit 4, canister lid 5, receiving area 6 and measuring receptacle 7.

Base unit 2 is shown in more detail in FIGS. 2*a* to 2*f*. Base unit 2 includes base 21, and support members 22. Base 21 includes mounts 211 for holding non-skid feet to help ensure that system 1 does not slide on the surface upon which it is placed. Support members 22 define receiving area 6 and include threaded holes 221 for accepting mounting screws to mount canister 3 to base unit 2. Base unit 2 defines receiving area 6 for receiving measuring receptacle 7. Base unit 2 is preferably constructed of a high quality, food approved, sturdy material, e.g., ABS, and polyethylene (P.E.). Further, the material is preferably suitable for use in a mass production process such as injection molding. In another embodiment, shown in FIG. 2*f*, removable tray 8 is slidably mounted within base 21 so that measuring receptacle 7 may be easily placed in and removed from receiving area 6 and for ease of cleaning system 1. The measuring receptacle 7 is preferably placed on removable tray 8 which slides into position underneath receiving area 6. If any dry product falls onto removable tray 8, for example if rotor unit 4 is accidentally operated without measuring receptacle 7 in place, removable tray 8 is removed and the dry product is returned to the canister through access opening 51 (see FIG. 6*b*).

Figure 3A:
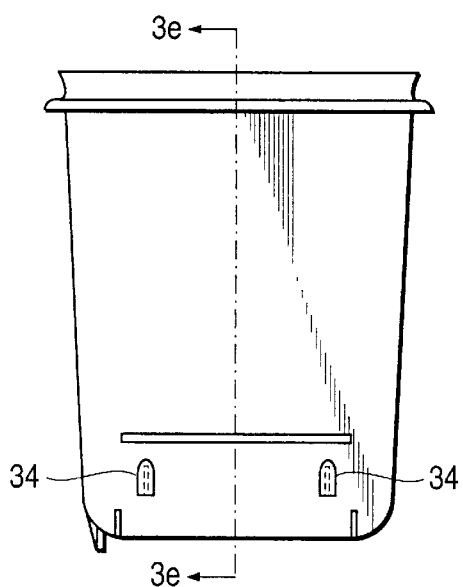
FIGS. 3a to 3e depict a canister of a no-mess bulk dispenser and measuring system according to one embodiment of the present invention.
Figure 3C:
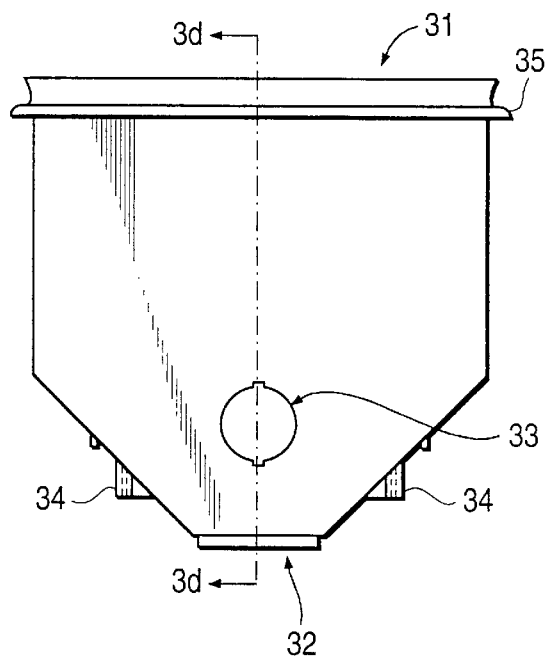
Figure 3B:
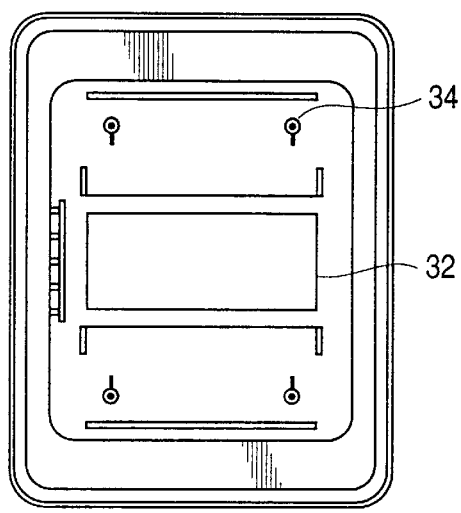
Figure 3E:
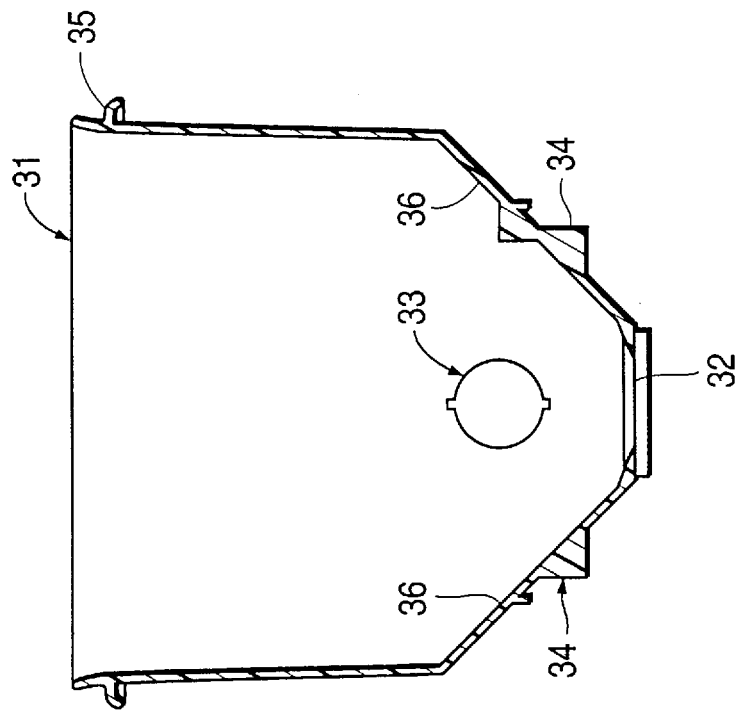
Figure 3D:
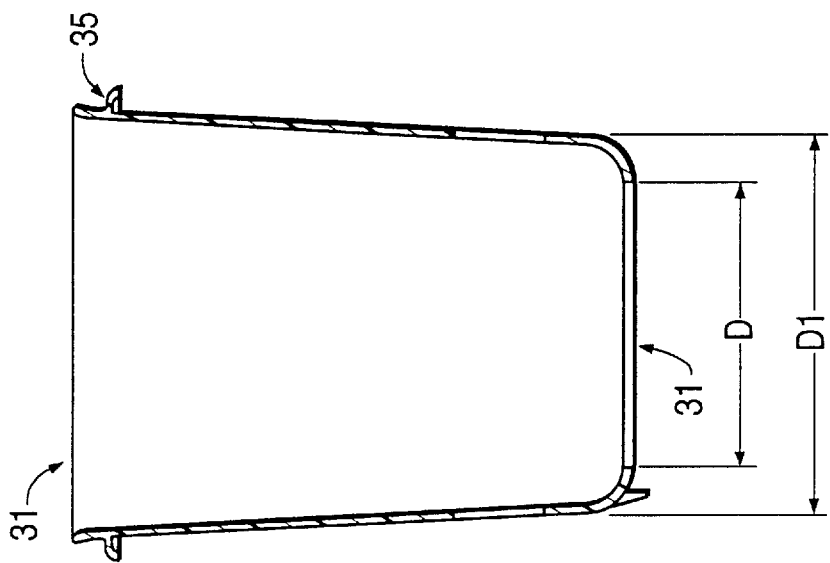

Canister 3 is shown in more detail in FIGS. 3*a*–3*e*. FIGS. 3*a*–3*c* show front, side and top views, respectively, of canister 3. Canister 3 includes top loading opening 31, outlet 32, notched hole 33, mounts 34 and side portions 36. Top loading opening 31 is defined by top edge 35 of canister 3. Top edge 35 is formed to sealingly engage canister lid 5. Outlet 32 is located in the bottom of canister 3 and allows the contents of canister 3 to be dispensed into measuring receptacle 7 by rotor unit 4. Notched hole 33 is cut in the front wall of canister 3 and is sized to accept bushings within which an axle for rotor unit 4 is mounted. A second hole is cut in the rear wall of canister 3 and is also sized to accept rotor unit 4. Notched hole 33 and the second hole are positioned to provide a horizontal support for rotor unit 4 within which rotor unit 4 can freely rotate. Rotor unit 4 is sized to fit within the notched hole and the second hole with 0/0 tolerance to provide an adequate seal. Canister 3, similar to base unit 2 is manufactured from a plastic-type material suitable for use in mass-production processes.

Further, canister 3 is preferably configured so that whatever dry product contained therein is adequately fed to outlet 32. The dry product within canister 3 is fed by the action of rotor unit 4 (explained below) and by gravity. In one embodiment, the slope of side portions 36 is sufficiently steep so dry product within canister 3 does not stick to side portions 36. In general, side portions 36 are sufficiently steep when gravitational force acting on the dry product is greater than any attractive forces within the dry product.

Rotor unit 4 is explained in more detail with reference to FIGS. 4*a*–4*i*. In one embodiment shown in FIGS. 4*a* and 4*b*, rotor unit 4 includes closing portion 42, sweep paddles 43, hollow portion 44 and rotor knob 45. Sweep paddles 43 are radial extensions from rotor unit 4. In operation, sweep paddles 43 rotate to propel dry goods in canister 3 out of outlet 32. Hollow portion 44 accepts axle 47 upon which rotor unit 4 rotates. Closing portion 42 is flat and operates to seal outlet 32.

Sweep paddles 43 are configured such that they sweep through the entire depth, D1, of canister 3 at the canister's lower portion. That is, the length of sweep paddle 43 at its longest point, D1N, is approximately equal to D1. Nevertheless, D1N is preferably slightly less than D1 so that sweep paddles 43 do not contact the walls of canister 3. In one preferred embodiment, D1 is approximately 5.0O and D1N, is approximately 4.80O. Closing portion 42 and sweep paddles 43 also include portions 42N and 43N having lengths DN and DO respectively. The length DO is approximately equal to the length D of outlet 32. In one preferred embodiment, D is approximately 3.8O and DN is approximately 3.85O. Further, the length DN is preferably slightly larger than the length of outlet 32. This allows closing portion 42 to form a tight seal with outlet 32 when system 1 is not in use. In one embodiment, DN is approximately 3.9O and D is approximately 3.8O. Further, portions 42N and 43N extend radially distances X and Y respectively from center, C, of rotor unit 4. In a preferred embodiment, the distances DN, X and Y are chosen such that, when rotor unit 4 rotates to propel dry goods out of canister 3, portion 42N of closing portion 42 and portion 43N of sweep paddle 43 extend into measuring receptacle 7 to level dry goods which have been propelled into measuring receptacle 7. In one embodiment the distances X and Y are approximately 2.00O and 1.94O respectively.

Figure 4A:
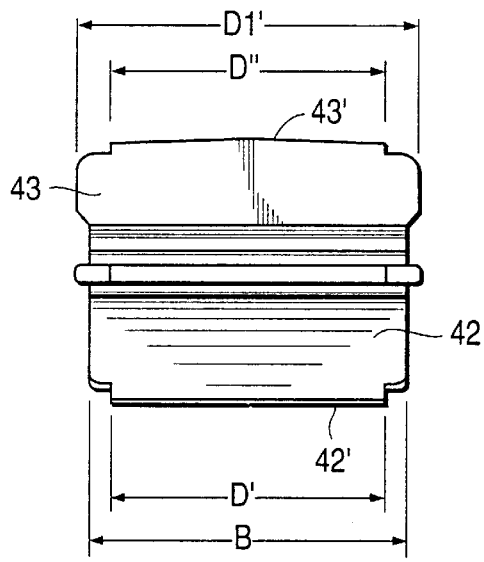
FIGS. 4a to 4l depict a rotational cylinder of a no-mess bulk dispenser and measuring system according to various embodiments of the present invention.
Figure 4B:
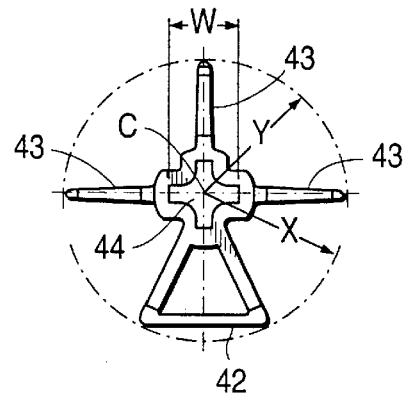
Figure 4C:
Figure 4D:
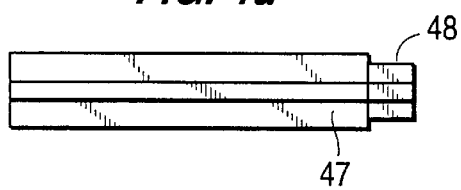
Figure 4E:
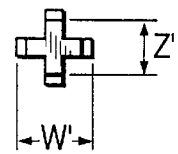
Figure 4F:
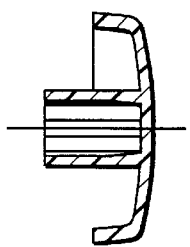
Figure 4G:
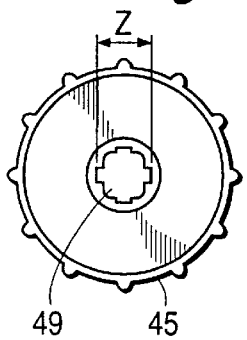
Figure 4H:
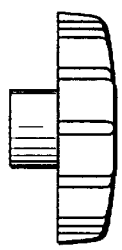
Figure 4I:
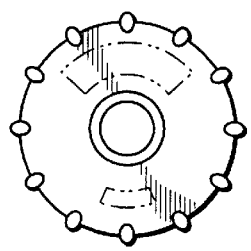

FIGS. 4*c*–4*e* show one embodiment of axle 47. According to this embodiment, axle 47 preferably has a cross-shaped cross section and has a cross sectional width WN. Moreover, hollow portion 44 is also cross-shaped with a cross sectional width W. In this embodiment, WN is approximately equal to but slightly less than W, e.g., WN is approximately 4.99O and W is approximately 5.00O. Axle 47 also has a reduced width portion 48 which is sized to fit snugly within center hole 49 of rotor knob 45. In one embodiment, the width Z of center hole 49 is approximately 0.76O and the width ZN of reduced portion 48 is approximately 0.75O. Rotor knob 45 is shown in greater detail in FIGS. 4*f*–4*i*.

Figure 5A:
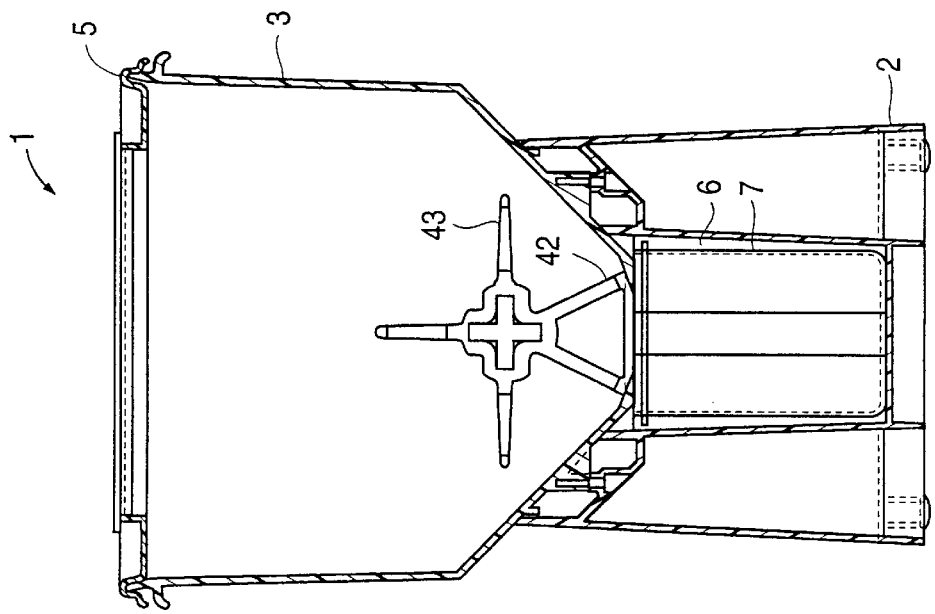
FIGS. 5a and 5b depict front and side sectional views of a no-mess bulk dispenser and measuring system according to one embodiment of the present invention.
Figure 5B:
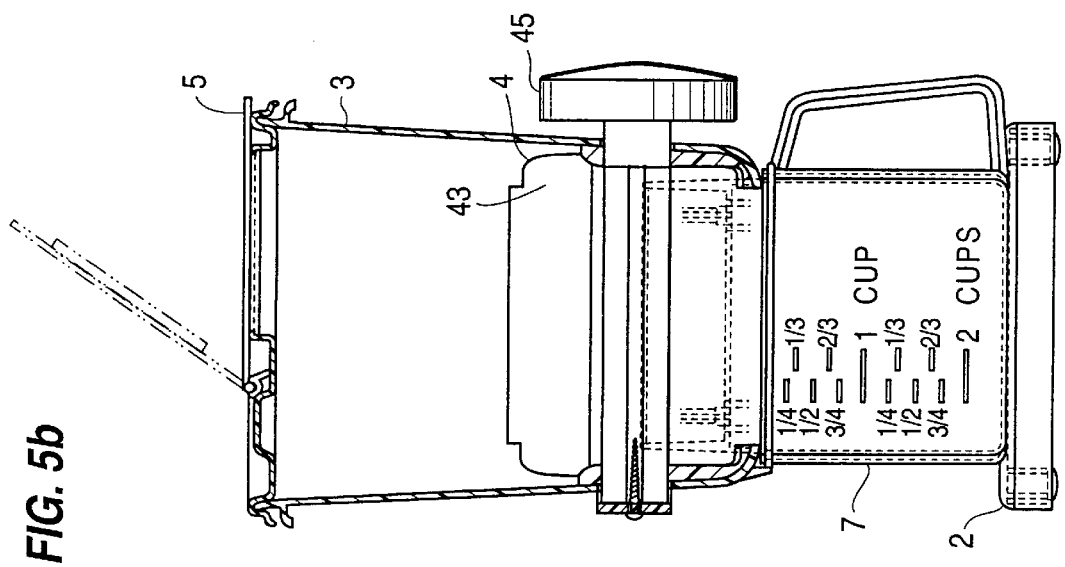
Figure 7A:
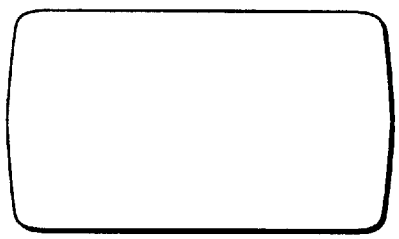
FIGS. 7a to 7f depict a measuring receptacle of a no-mess bulk dispenser and measuring system according to one embodiment of the present invention.
Figure 7C:
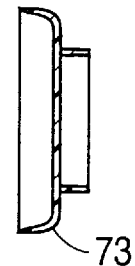
Figure 7B:
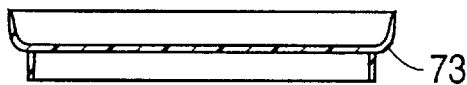
Figure 7D:
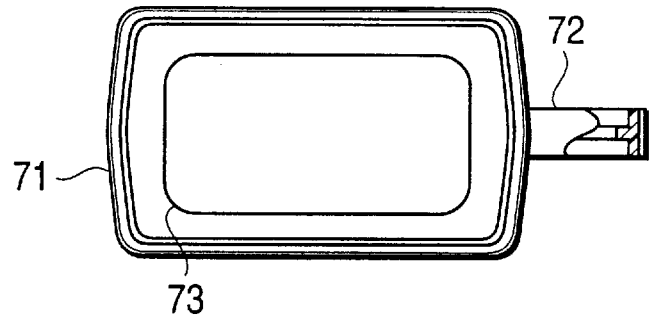
Figure 7E:
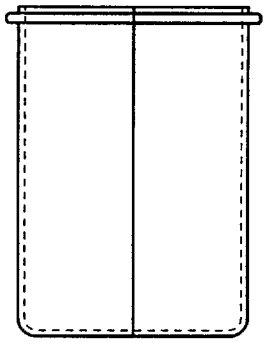
Figure 7F:
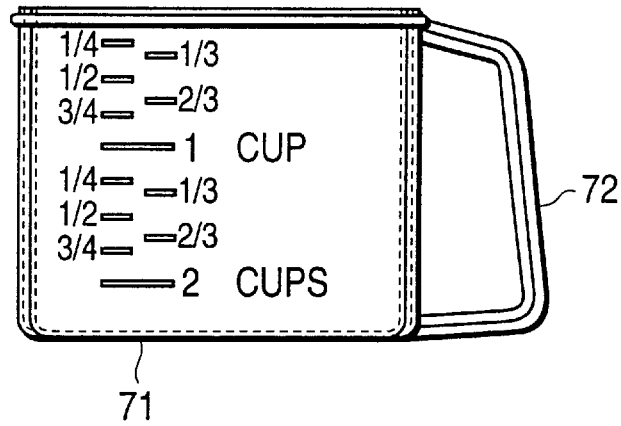

FIGS. 5*a* and 5*b* show system 1 in section so that rotor unit 4 can be viewed within canister 3. As can be seen from FIG. 5*a*, closing portion 42 of rotor unit 4 forms a tight seal with outlet 32 of canister 3. Further, it is apparent from FIG. 5*b* that knob 45 is attached to one end of axle 47 and enables rotor unit 4 to be manually rotated so that dry goods can be propelled from canister 3 into measuring receptacle 7.

Figure 4L:
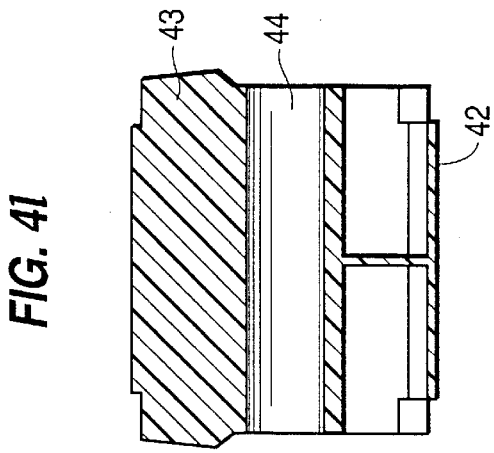
Figure 4K:
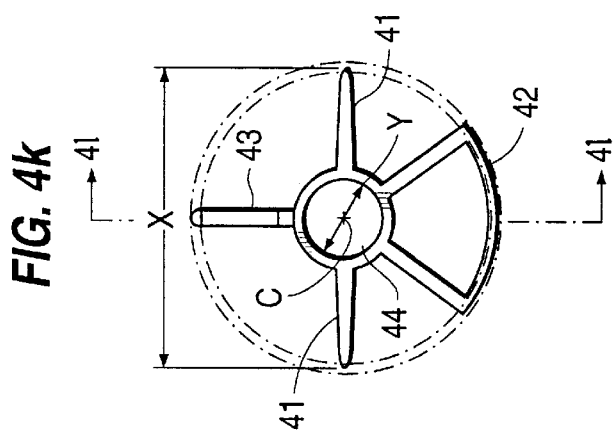
Figure 4J:
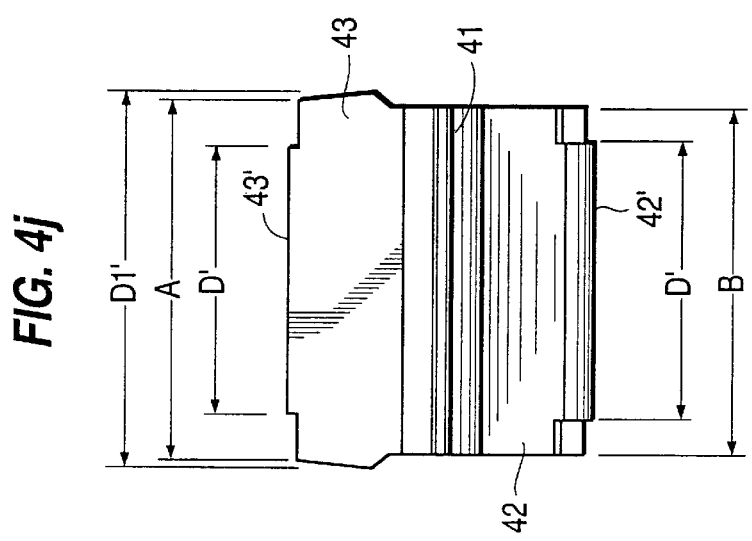

A second embodiment of rotor unit 4 is shown in FIGS. 4*j*–4*l*. According to this embodiment, rotor unit 4 includes paddles 41, closing portion 42, sweep paddle 43 and cylindrical hollow portion 44. Paddles 41 and sweep paddle 43 are radial extensions from rotor unit 4. In this embodiment, paddles 41 and 43 rotate to propel dry goods in canister 3 out of outlet 32. Closing portion 42 operates to seal outlet 32. In operation, cylindrical hollow portion 44 accepts an axle, which may be a molded ABS shaft, rod or tube with an inside diameter of Y. In one embodiment, the axle has a radius of approximately ½O.

Sweep paddle 43 is configured such that it will sweep through the entire depth, D1, of canister 3. That is, the length of sweep paddle 43 at its longest point, D1N, is approximately equal to D1. Nevertheless, D1N is preferably slightly less than D1 so that sweep paddle 41 does not contact the walls of canister 3, e.g., D1 is approximately 4.98O and D1N, is approximately 4.85O. Closing portion 42 and sweep paddle 43 also include portions 42N and 43N having a length DN. The length DN is approximately equal to, but slightly less than, the length D of outlet 32. In one preferred embodiment, D is approximately 3.55O and DN is approximately 3.54O. Further, portions 42N and 43N extend radially a distance X/2 from center, C, of rotor unit 4. In a preferred embodiment, the distances DN and X are chosen such that, when rotor unit 4 rotates to propel dry goods out of canister 3, portion 42N of closing portion 42 and portion 41N of sweep paddle 41 extend into measuring receptacle 7 to level dry goods which have been propelled into measuring receptacle 7.

Canister lid 5 is shown in FIGS. 6a–6g. Canister lid 5 includes access opening 51 and is sized to cover top loading opening 31 of canister 3. Access opening 51 is useful, for example, to remove small amounts of the contents of canister 3. Canister lid 5 also includes hinged door 52 to cover access opening 51. Canister lid 5 is manufactured to include sealing groove 53 to engage top edge 35 of canister 3 with a friction or snap fit. Similar to base unit 2 and canister 3, canister lid 5 is manufactured from a plastic-type material suitable for mass production processes.

Measuring receptacle 7 is shown in FIGS. 7a–7f. Measuring receptacle includes cup portion 71, handle portion 72, and friction fit bottom 73. The top of cup portion 71 is sized slightly larger than outlet 32 so that dry goods which are propelled out of outlet 32 will fall into cup portion 71 of measuring receptacle 7. Friction fit bottom 72, is sized to fit snugly in cup portion 71. Friction fit bottom 72 slides within cup portion 71 so that the volume of measuring receptacle 7 can be adjusted without changing the size of the top of measuring receptacle 7 or the position of the top of measuring receptacle 7 within receiving area 6. This enables cup portion 71 to be sized so that, as it is removed from receiving area 6, its top edge scraps the flat surface of closing portion 42. With this configuration, any excess dry product adhering to the flat surface of closing portion 42 will be scraped into measuring receptacle 7 thereby preventing spillage.

Cup portion 71 includes measurement markings on the side. When adjusting the volume of the cup, friction fit bottom 72 is aligned with a desired one of measurement markings. To ease this adjustment process, friction fit bottom 72 optionally includes a finger grip on its bottom surface (not shown). In an alternative embodiment, measuring receptacle 7 is nested. The nested measuring receptacle has a number of different volume cups, with the lower volume cups designed to fit snugly on top of the larger volume cups. In this way, the nested measuring receptacle also has an adjustable volume without substantially changing the size of the top of the receptacle or position of the top of the measuring receptacle within receiving area 6.

Although a detailed description of a no-mess dispensing/measuring system according to one embodiment of the present invention has been provided, it should be understood that the scope of the invention is not to be limited thereby.

The scope of the invention is to be determined by the claims which follow and any modifications or alternatives apparent to one of ordinary skill in the art.

I claim:

1. A system for storing and dispensing a bulk dry product comprising:

(a) a body portion comprising:
 (i) a base;
 (ii) at least one support member attached to the body portion;
 (iii) a canister for storing bulk dry product, having a bottom portion, a top portion and sidewalls connecting said top portion and said bottom portion, said top portion defining an opening, said canister integral with and positioned above the base, said base and said at least one support member defining a dry product receiving area beneath the canister; and,
 (iv) an outlet positioned in the bottom portion of said canister in communication with said dry product receiving area such that dry product may exit said canister through said outlet into said dry product receiving area;

(b) a rotor unit for dispensing dry product through said outlet into said dry product receiving area, said rotor unit positioned in the bottom portion of said canister, said rotor unit comprising:
 (i) a shaft rotatably mounted in the bottom portion of said canister above said outlet; and,
 (ii) a plurality of paddles extending radially from said shaft, each paddle angularly separated from an adjacent paddle, wherein two of said paddles are connected by a sealing section at a point distal from the shaft, said sealing section operating to seal said outlet, each said paddle sized to extend into said dry product receiving area and into said canister above the outlet;

(c) an operational control mounted to one end of said shaft on the exterior of said canister and operative to rotate said shaft; and (d) at least one measuring receptacle sized to fit within said dry product receiving area and to contain a definite volume of dry product, said at least one measuring receptacle having an opening sized larger than said outlet;

wherein said measuring receptacle when placed within said dry product receiving area receives dry product propelled out of said canister by rotation of said shaft and at least one of said paddles operates to level said dry product in said measuring receptacle placed within said dry product receiving area.

2. The system of claim 1, further comprising a tray positioned within said dry product receiving area and operative to receive dry product propelled from said outlet but not received by said measuring receptacle.

3. The system of claim 2 wherein the tray is fixed within the base.

4. The system of claim 2 wherein the tray is slidably mounted within the dry product receiving area.

5. The system of claim 1, further comprising a removable cover closing the opening in said top portion.

6. The system of claim 1, wherein said sidewalls form a rectangular horizontal cross-section.

7. The system of claim 1, wherein at least a portion of said sidewalls form a horizontal cross-section which decreases in area as said sidewalls approach said outlet.

8. The system of claim 7, wherein said at least a portion of said sidewalls have a slope sufficient to prevent the adherance of dry product.

9. The system of claim 7, wherein said area decreases at a rate whereby the sidewalls proximal to said outlet have slope sufficient to guide said dry product into said outlet.

10. The system of claim 1, further comprising said dry product, wherein said dry product comprises a powder.

11. The system of claim 10, wherein said powder is flour.

12. The system of claim 1 wherein the sealing section has a flat lower surface.

13. The system of claim 12 wherein the measuring receptacle includes a top edge and is sized so the top edge scrapes the flat lower surface of the sealing section when the measuring receptacle is removed from the dry product receiving area.

14. The system of claim 1 wherein the sealing section has a curved lower surface.

* * * * *